(12) United States Patent
Chapiewski et al.

(10) Patent No.: US 11,244,314 B2
(45) Date of Patent: Feb. 8, 2022

(54) DUAL CONTROLS FOR PROCESSING ELECTRONIC TRANSACTIONS

(71) Applicant: PAYPAL, INC., San Jose, CA (US)

(72) Inventors: Guilherme de Barros Chapiewski, San Jose, CA (US); Venkata Chalapathy Pidathala, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/847,188

(22) Filed: Apr. 13, 2020

(65) Prior Publication Data
US 2021/0319442 A1   Oct. 14, 2021

(51) Int. Cl.
  *G06Q 20/40*  (2012.01)
  *H04L 29/06*  (2006.01)
  *G06F 16/23*  (2019.01)
  *G06Q 10/10*  (2012.01)
  *G06Q 20/42*  (2012.01)
  (Continued)

(52) U.S. Cl.
  CPC ......... *G06Q 20/40* (2013.01); *G06F 16/2379* (2019.01); *G06Q 10/10* (2013.01); *G06Q 20/407* (2013.01); *G06Q 20/42* (2013.01); *G06Q 30/0185* (2013.01); *G06Q 40/02* (2013.01); *G06Q 40/12* (2013.12); *H04L 63/102* (2013.01)

(58) Field of Classification Search
  CPC ........ G06Q 20/40; G06Q 40/12; G06Q 10/10; G06Q 20/407; G06Q 20/42; G06Q 30/0185; G06Q 40/02; G06F 16/2379; H04L 63/102

USPC ....................................................... 705/3–44
See application file for complete search history.

(56) References Cited

U.S. PATENT DOCUMENTS 8,208,612 B2 * 6/2012 Walker ................... H04L 29/06
                                              379/93.02
8,423,466 B2 * 4/2013 Lane ...................... G06Q 20/40
                                              705/44

(Continued)

OTHER PUBLICATIONS

Braun et al., "Understanding Risk Management in Emerging Retail Payments", Economic Policy Review—Federal Reserve Bank of New York 14.2: 137-159, Federal Reserve Bank of New York, (ProQuest Doc ID: 210395958) Sep. 2008.*

(Continued)

*Primary Examiner* — Frantzy Poinvil
(74) *Attorney, Agent, or Firm* — Haynes and Boone, LLP

(57) ABSTRACT

Methods and systems are presented for enabling an online service provider to process transaction requests according to a dual control workflow using multiple transaction processing systems that are only configured to process transaction requests according to a single control workflow. A dual control module is implemented between an interface server and the transaction processing systems. The dual control module may intercept transaction requests from the interface server. The dual control module may withhold transaction requests from being sent to any one of the transaction processing systems until a set of criteria is satisfied according to the dual control workflow. The dual control module may obtain approvals and/or denials from designated approvers. Once the set of criteria is satisfied for a transaction request, the dual control module may forward the transaction request to one of the transaction processing systems for processing.

20 Claims, 6 Drawing Sheets

(51) Int. Cl.
*G06Q 40/00* (2012.01)
*G06Q 30/00* (2012.01)
*G06Q 40/02* (2012.01)

(56) References Cited

U.S. PATENT DOCUMENTS

| | | | | |
|---|---|---|---|---|
| 8,751,317 | B2* | 6/2014 | Qawami | H04W 4/12 |
| | | | | 705/21 |
| 8,768,838 | B1* | 7/2014 | Hoffman | G06Q 40/00 |
| | | | | 705/44 |
| 8,924,259 | B2* | 12/2014 | Neighman | G06Q 20/4012 |
| | | | | 705/16 |
| 2012/0290421 | A1* | 11/2012 | Qawami | G06Q 20/3255 |
| | | | | 705/21 |
| 2013/0212022 | A1* | 8/2013 | Lane | G06Q 20/327 |
| | | | | 705/44 |
| 2013/0317980 | A1* | 11/2013 | Davis | G06Q 20/32 |
| | | | | 705/39 |
| 2014/0180927 | A1* | 6/2014 | Walker | G06Q 20/12 |
| | | | | 705/44 |
| 2015/0332226 | A1* | 11/2015 | Wu | G06Q 20/425 |
| | | | | 705/39 |
| 2015/0339656 | A1* | 11/2015 | Wilson | G06Q 20/385 |
| | | | | 705/44 |
| 2016/0253650 | A1* | 9/2016 | Cohen | G06Q 20/407 |
| | | | | 705/44 |
| 2016/0253665 | A1* | 9/2016 | Van Os | G06Q 20/32 |
| | | | | 705/44 |
| 2017/0237739 | A1* | 8/2017 | Nandakumar | G06Q 20/383 |
| | | | | 705/44 |

OTHER PUBLICATIONS

"Zuumigo rolls out new payment validation service to prevent credit card fraud", World Market Intelligence News [London], Proquest Doc ID: 1666452643, Mar. 25, 2015.*

* cited by examiner

DUAL CONTROLS FOR PROCESSING ELECTRONIC TRANSACTIONS

TECHNICAL FIELD

The present specification generally relates to electronic transaction workflows, and more specifically, to dynamically modifying workflows for processing electronic transactions, according to various embodiments of the disclosure.

BACKGROUND

As an online service provider is expanding or changing its services provided to its users, the software applications (e.g., transaction processing systems) that were developed for providing the services may need to be modified to accommodate the expansion or changes. For example, the online service provider may initially support only single control in processing transaction (e.g., allowing only those who has authority to process a transaction to submit a transaction request), the transaction processing systems may be developed to process transaction requests according to a single control workflow. However, when the online service provider expands its services to enable dual control in processing transactions (e.g., allowing a requester who has no authority to process a transaction to submit a transaction request), the transaction processing systems may have to be modified to process requests according to a dual control workflow, which requires additional steps for obtaining approval from an approver after receiving the transaction request from a requester.

However, modifying individual transaction processing systems, especially when the changes are to be applied to multiple transaction processing systems, can be challenging. For example, the modifications may introduce new defects to the transaction processing systems. Furthermore, it may be inefficient to make the same type of modifications to each of the transaction processing systems individually. Thus, there is a need for providing a mechanism to dynamically modifying workflows for transaction processing systems.

Figure 1:
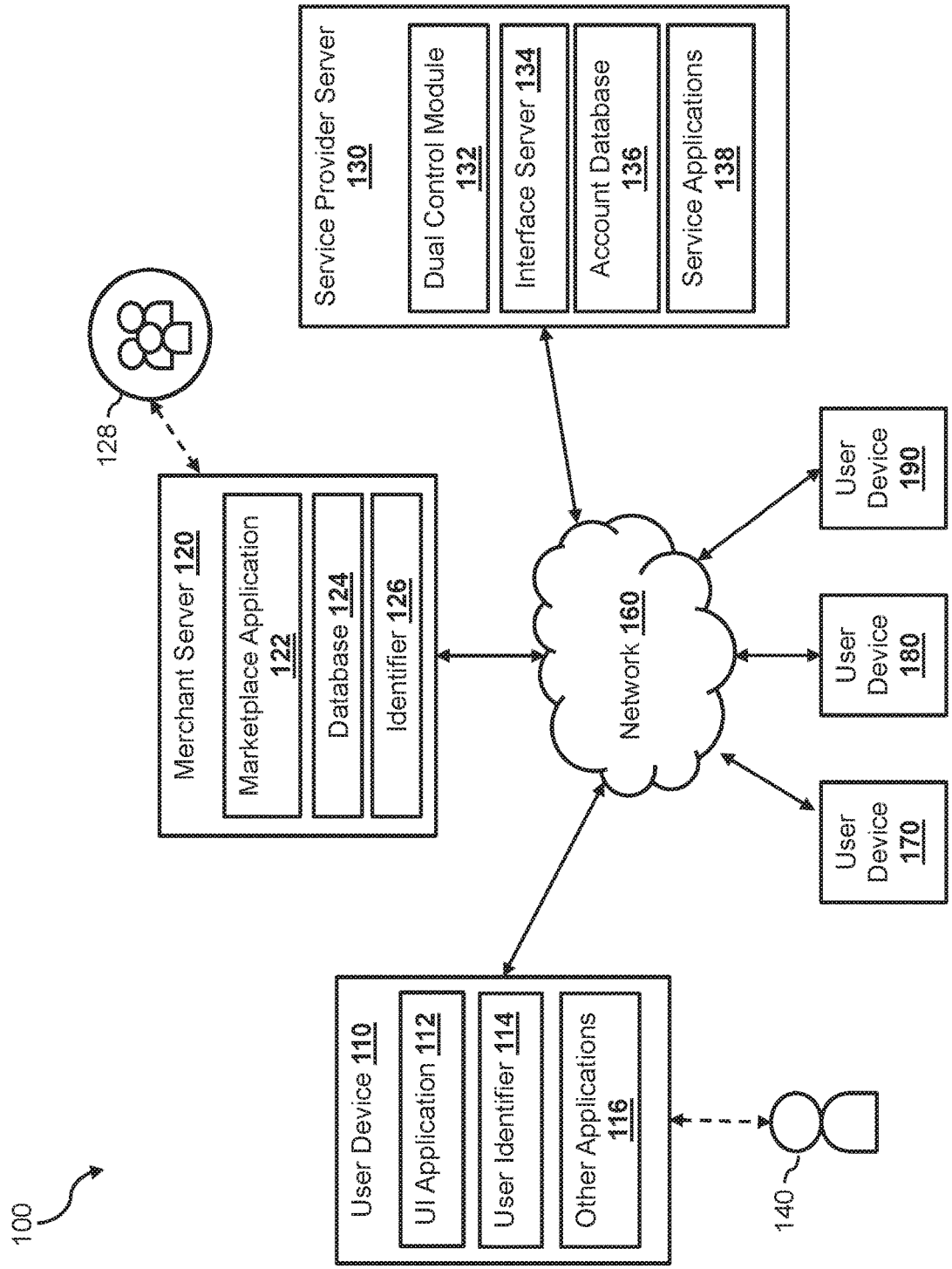
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for enabling an online service provider to process transaction requests according to a dual control workflow using multiple transaction processing systems that are only configured to process transaction requests according to a single control workflow. As discussed above, the online service provider may initially support only single control for processing transaction requests. For example, when a transaction processing system of the online service provider receives a transaction request, the transaction processing system may only check whether a person who submits the transaction request has authority to perform the transaction associated with the transaction request. The transaction processing system may proceed with processing the transaction request if the person has authority to perform the transaction and may deny the transaction request if the person does not have authority to perform the transaction.

The online service provider may maintain (or has control over) multiple transaction processing systems, each for processing different types of transactions. For example, the online service provider may maintain a transaction processing system for processing onboarding transaction requests (e.g., creating new user accounts for different organizations), another transaction processing system for processing payment transactions, another transaction processing system for processing transaction disputes, another transaction processing system for processing refund transactions, etc.

As users of the online service provider becomes more diverse and sophisticated (e.g., corporate and organization users instead of individual users, etc.), additional services and workflows may be desirable. For example, an organization user of the online service provider may want multiple individual persons (e.g., agents of the organization, such as employees, contractors, etc.) to have access to account resources and the online services associated with an account of the organization with the online service provider through multiple user credentials. Each of the agents may access the resources and online services of the online service provider on behalf of the organization via a corresponding user credential (e.g., a username, a password, etc.). The organization may also assign different roles and privileges to the different agents. For example, a dispute manager of the organization may be responsible for processing disputes and refunds to customers, a marketing manager of the organization may be responsible for paying different vendors on behalf of the organization, and an investment manager of the organization may be responsible for moving funds among accounts associated with the organization. Thus, these different agents may all need to access the account of the organization with the online service provider. For example, the dispute manager may submit to the online service provider requests for paying back money to customers from one or more funding accounts associated with the account, the marketing manager may submit to the online service provider requests for paying money to vendors from one or more funding accounts associated with the account, and the investment manager may submit to the online service provider requests for transferring funds between funding accounts associated with the account.

According to a single control workflow, each of the agents may be granted access to the account of the organization via their corresponding user credentials. The user credentials of the dispute manager, the marketing manager, and the investment manager may be assigned privileges for accessing the account, such that whenever any one of the dispute manager, the marketing manager, and the investment manager submits a request to access (e.g., withdraw funds, transfer funds, etc.) the account of the organization via the corresponding user credential, a transaction processing system of the online service provider may process the transaction request based on the privileges associated with the user credential.

However, as the organization continues to grow, more agents may need to access the account of the organization (e.g., by submitting transaction requests to the online service provider on behalf of the organization), which makes it difficult for the organization to keep track of accesses and usages of the account. It is conceivable that one or more of the user credentials may be used to conduct unauthorized transactions associated with the account of the organization (e.g., a user credential associated with an agent may be obtained by someone other than the agent, malicious employees of the organization may steal from the funding account(s) of the organization, etc.). Thus, in order to avoid mis-use of resources, the organization may desire to adopt a dual control workflow for processing one or more types of transactions associated with the account.

For example, the organization may wish to designate certain types of transactions (e.g., high risk transactions such as withdrawing and/or transferring from the funding account funds in an amount above a threshold) to be processed according to the dual control workflow. According to the dual control workflow, the organization may designate one or more agents of the organization, such as a treasurer of the organization, to be an approver of the selected types of transactions. The approver of a transaction request is usually a different person (e.g., another agent of the organization) than the one submitting a transaction request (also known as a requester). When the requester submits a transaction request of the selected transaction type to the online service provider, the online service provider may not immediately process the transaction request. Instead, the online service provider may prompt an approver (e.g., the treasurer) for an approval for the transaction request and may process the transaction request only after receiving the approval from the approver. Thus, by requiring two or more users to be involved in a transaction request, the dual control workflow enhances security of resources of the organization with the online service provider.

To adopt the dual control workflow, the online service provider may modify each of the transaction processing systems individually (e.g., adding the dual control logic to the programming code associated with each of the transaction processing systems). However, modifying individual transaction processing systems, especially when the changes are to be applied to multiple transaction processing systems of the online service provider, can be challenging. For example, the modifications may introduce new defects to the transaction processing systems. Furthermore, it may be inefficient to make the same type of modifications to each of the transaction processing systems individually.

Thus, according to various embodiments of the disclosure, a dual control system may dynamically and selectively enable a dual control workflow for one or more transaction processing systems of an online service provider, and in some embodiments, without requiring modifications to the one or more transaction processing systems. In some embodiments, the one or more transaction processing systems may be configured to process transaction requests according to a single control workflow. For example, according to a normal (e.g., a single control) workflow, a requester (e.g., an employee of the organization) may submit a transaction request (e.g., a fund withdrawal request, a refund request, a payment request, etc.) to an interface server (e.g., a web server, a mobile application server, etc.) associated with the online service provider (e.g., a website, a mobile application interface, etc.) using user credentials of the user. Based on a transaction type associated with the transaction request, the interface server may route the transaction request to one of the transaction processing systems of the online service provider corresponding to the transaction type for processing the transaction request. When the transaction processing system receives the transaction request from the interface server, the transaction processing system may check whether the requester has authority to perform the transaction associated with the transaction request (e.g., based on the user credentials). The transaction processing system may proceed with processing the transaction request if the requester has authority to perform the transaction and may deny the transaction request if the requester account does not have authority to perform the transaction.

In some embodiments, the dual control system may be implemented as a module, such as an additional layer between the interface server and the transaction processing systems of the online service provider, to dynamically and selectively enable a dual control workflow for processing transaction requests by one or more of the transaction processing systems. For example, the dual control system of some embodiments may be implemented in a network path between the interface server and the transaction processing systems. In some embodiments, the dual control system may include an interface (that mimics an interface of a transaction processing system) to receive all communication transmitted by the interface server to the transaction processing systems and to transmit communication to the interface server, such that the interface server may communicate with the dual control system without requiring any modifications to the interface server. The dual control system may also include an interface (that mimics an interface of the interface server) to receive all communication transmitted by the transaction processing systems to the interface server and to transmit communication to the transaction processing systems, such that the transaction processing systems may communicate with the dual control system without requiring any modifications to any one of the transaction processing system. In some embodiments, the interface server and/or the transaction processing systems may not be aware the presence of the dual control system.

In some embodiments, the dual control system may provide a dual control configuration user interface on a device for configuring the dual control system. For example, the dual control configuration user interface may be provided to all of the users (e.g., corporate users, organization users, etc.) of the online service provider such that each of the users (e.g., each organization) may configure the type(s) of accesses (e.g., what types of transactions) that require the dual control workflow. In some embodiments, the dual control system may present, for each user on the dual control configuration user interface, a list of all of the transaction types associated with the user. For example, the user may be a merchant that uses the online service provider for receiving payments from its customers, facilitating disputes with the customers, providing refunds to the customers, and providing payments to vendors. Thus, the dual control system may list, on the dual control configuration user interface, different transaction types for the user, such as an account summary viewing transaction type, a payment transaction type, a funds transfer transaction type, and a cash withdrawal transaction type. The user (or an agent of the user), via the dual control configuration user interface, may enable the dual control workflow for one or more of the listed transaction types, for example, by toggling a switch or a toggle provided on the dual control configuration user interface.

In some embodiments, the dual control system may also enable each user, via the dual control configuration user interface, to provide additional conditions for enabling the dual control workflow. For example, a user may not want the dual control workflow to be enabled on all payment transactions, but only on certain high-risk payment transactions such as payment transactions that are over a threshold amount (e.g., $1,000, $5,000, etc.), payment transactions to a certain payee, etc. Thus, the dual control configuration user interface may enable the user to specify not only a transaction type, but also one or more conditions that need to be satisfied for the transaction type, for triggering the dual control workflow. Using the dual control configuration user interface, different users (e.g., different organizations) of the online service provider may enable the dual control workflows on different types of transactions. In some embodiments, the dual control system may store the different configurations associated with different users (obtained via the dual control configuration user interface) in dual control configuration files that are associated with the corresponding users.

Once the dual control system is communicatively coupled with the interface server and the transaction processing systems of the online service provider, the dual control system may begin intercepting transaction requests that are intended for one or more of the transaction processing systems of the online service provider. For example, the dual control system may interface with the interface server and may receive any transaction requests that the interface server receives from user devices (e.g., submitted by requesters associated with one or more accounts of the online service provider). In some embodiments, when a requester submits a transaction request to the interface server (e.g., using user credentials associated with the requester), the interface server sends the transaction request to the dual control system, instead of the transaction processing systems. In some embodiments, since the dual control system is implemented between the interface server and the transaction processing systems, the dual control system may be configured to obtain the transaction request when the interface server sends the transaction request to one of the transaction processing system.

Upon receiving a transaction request from the interface server, the dual control system may determine whether the dual control workflow should be applied for processing the transaction request. For example, the dual control system may determine an account of the online service provider associated with transaction request, and determine, based on the dual control configuration associated with the account, whether the transaction request satisfies a set of conditions for triggering the dual control workflow. In one example, when the dual control configuration associated with organization specifies that the dual control workflow should be applied for payment transactions for an amount over $5,000, the dual control system may determine whether the transaction request is a request for a payment transaction and whether the payment transaction is for an amount over $5,000.

If the set of conditions is not satisfied (e.g., the transaction request is not for a payment transaction or is not for an amount over $5,000), the dual control system may forward the transaction request to one of the transaction processing systems for processing the transaction request. However, if the set of conditions is satisfied (e.g., the transaction request is for a payment transaction and the amount is over $5,000), the dual control system may trigger the dual control workflow for the transaction request. According to the dual control workflow, the dual control system may withhold the transaction request from being accessed by any one of the transaction processing systems until a set of criteria (specified in the dual control configuration associated with the organization) is satisfied. For example, the dual control configuration may specify a person who has the approval authority (e.g., an identity of an approver) for the transaction request. For example, the dual control configuration may specify an approver that has the authority to approve payment transactions over $5,000.

Thus, the dual control system may determine whether the requester is the same person as the approver. If the requester is not the same person as the approver, the dual control system may determine that the set of criteria (e.g., an approval by the approver) is not satisfied. In some embodiments, the dual control system may withhold the transaction request from the transaction processing systems until the set of criteria is satisfied. In some embodiments, once the dual control system determines that the transaction request should be processed according to the dual control workflow, the dual control system may modify the transaction request. The modifying of the transaction request may enable the dual control system to track a status and/or a progress of processing the transaction request according to the dual control workflow.

When a transaction request is processed according to the single control workflow, the transaction request (and its associated transaction) can be processed at the same time during the same interface session (e.g., a web session) with the requester. In such a scenario, after the interface server that receives the transaction request, passes the transaction request to the transaction processing systems for processing, and receives a response from one of the transaction processing systems can correspond the response to the transaction request based on the web session (e.g., a web session identifier, etc.). However, according to the dual control workflow, the transaction request may be submitted by the requester to the interface server at a first time during a first interface session, an approval may be obtained from the approver at a second time (that can be much later than the first time such as an hour later, a day later, etc.) during a second interface session, and the transaction associated with the transaction request may be processed by a transaction processing system at a third time subsequent to the second time without any information related to the first interface session and the second interface session. Thus, the dual control system may modify the transaction request and store the modified transaction request in a data record in order to track a status and/or a progress of processing the transaction request through the different interface sessions and the processing by the transaction processing system.

In some embodiments, the modifying of the transaction request may include generating a dual control workflow identifier (or other types of metadata for embedding into the transaction request) for the transaction request and inserting the dual control workflow identifier into the transaction request. The dual control workflow identifier can be used for tracking the progress of the processing of the transaction request and its associated transaction. The dual control system may store the modified transaction request and its associated data (e.g., payload, parameters, identity of the requester, etc.) as a new record in a data storage associated with the dual control system. In some embodiments, the data storage for storing the pending transaction requests may be external to and may be inaccessible by the transaction processing systems of the online service provider, such that the transaction processing systems may not have knowledge of such a transaction request being submitted to the online service provider. Furthermore, modifications to the transaction processing systems may not be necessary to accommodate any additional tasks for enabling the facilitating the dual control workflow implemented by the dual control system.

In some embodiments, upon determining that the transaction request requires an approval from the approver to satisfy the set of criteria according to the dual control configuration, the dual control system may transmit an approval request to the approver. For example, the dual control system may provide a pending approval interface when the approver uses her user credential to log in to the account of the organization. The pending approval interface may present all of the pending transaction requests that are awaiting the approver's approval to satisfy the set of criteria associated with the pending transaction requests. The approver may then interact with the pending approval interface to provide approval(s) to one or more of the pending transaction request(s). Once the dual control system receives an approval from the approver for the transaction request via the pending approval interface, the dual control system may update the record associated with the transaction request stored in the data storage. In some embodiments, the dual control system may insert data associated with the approval (e.g., identity of the approver, date and time of approval received, etc.) into the record. The dual control system may then determine whether the set of criteria is satisfied based on the record. For example, the dual control system may determine that the set of criteria is satisfied for the transaction request by determining that the approver has approved the transaction request based on the record. Once the dual control system determines that the set of criteria is satisfied, the dual control system may forward (transmit) the modified transaction request (along with its associated data such as the payload, the parameters, a transaction identifier, etc.) to one of the transaction processing system for processing the transaction request.

When the transaction processing system receives the modified transaction request from the dual control system, the transaction processing system may process the modified transaction request based on its associated data (e.g., the payload, the parameters, etc.) according to the normal workflow (e.g., single control workflow), as if the modified transaction request is received directly from the interface server. After processing the modified transaction request, the transaction processing system may transmit a response (e.g., a denial of the transaction request, a transaction complete response, etc.) to the interface server. Without implementing the dual control system, the response may be sent from the transaction processing system directly to the interface server. The interface server may provide the response to the requester via a user interface. However, when the dual control system is implemented between the interface server and the transaction processing systems, the dual control system may intercept the response from the transaction processing system. The dual control system may update the record associated with the transaction request (e.g., based on the dual control workflow identifier included in the response) with the response. In some embodiments, the dual control system may forward the response to the interface server. In some embodiments, the dual control system may provide the response to both the requester and the approver, for example, on a user interface when the requester or the approver logs in to the account.

Once the transaction request is processed, the dual control system may move the record from the data storage to a permanent transaction record database. The record stored in the transaction record database may be used for creating an audit trail for the transaction. For example, subsequent to processing the transaction request, the user (or an agent of the user) may request to view an audit trail of the transaction (e.g., based on the transaction identifier) via an interface provided by the dual control system. The dual control system may determine that the transaction identifier corresponds to the dual control workflow identifier based on a mapping generated by the dual control system. Using the dual control workflow identifier, the dual control system may retrieve the record from the transaction record database. The dual control system may generate an audit trail based on the record. In some embodiments, the audit trail may specify the persons (e.g., the requester, the approver, etc.) who were involved in the transaction. The audit trail may also indicate any additional data involving the processing of the transaction, such as notes that were provided by the requester for the approver to consider (e.g., reasons for the transaction, etc.), timestamps of the submission of the transaction request and the approval, and other information. In some embodiments, the dual control system may generate the audit trail as a timeline showing a series of actions (e.g., transaction request submission, obtaining approval, complete processing of the transaction, etc.) related to the transaction. The dual control system may present the audit trail on an interface for the user.

FIG. 1 illustrates an electronic transaction system 100 within which the dual control system may be implemented according to one embodiment of the disclosure. The electronic transaction system 100 includes a service provider server 130 associated with an online service provider, a merchant server 120 associated with a merchant 128, and user devices 110 and 170-190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via a website hosted by the merchant server 120 or a point-of-sale (POS) system associated with the merchant server 120 through one or more software applications associated with the service provider server 130 and/or the merchant server 120. The user 140 may also log in to a user account to access account services or conduct electronic transactions (e.g., payment transactions, fund transfer transaction, adding a funding source transaction, onboarding transactions, etc.) with the online service provider via the service provider server 130. Similarly, the merchant 128 associated with the merchant server 120 may use the merchant server 120 to log in to a merchant account to conduct electronic transactions (e.g., payment transactions, onboarding transactions, refund transactions, dispute transactions, fund transfer transactions, etc.) with the online service provider via the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile application, etc.), which may be utilized by the user 140 to conduct electronic transactions (e.g., online payment transactions, etc.) with the service provider server 130 over the network 160. In one implementation, the user interface application 112 includes a proprietary software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may be one of the device attributes requested by the webpages. Thus, when executing the one or more functions based on the API calls, the user interface application 112 may retrieve the device identifier (e.g., from the registry of the user device 110, from the operating system running on the user device 110, etc.) and provide the device identifier to the webpages.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

The merchant 128 (or agents of the merchant 128) may also use the merchant server 120 or other user devices, such as user devices 170-190, to communicate with the service provider server 130 over the network 160. Each of the user devices 170-190 may be implemented similarly and may include similar functions as the user device 110. For example, the merchant (and/or individual persons such as employees of the merchant) may use the merchant server 120 or the user devices 170-190 to communicate with the service provider server 130 in the course of various services offered by the service provider to a merchant, such as payment intermediary between customers of the merchant and the merchant itself. In some embodiments, both the merchant 128 and the user 140 are users of the online service provider. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant 128 may also have an account with the service provider server 130 that allows the merchant (and/or its agents) to perform various transactions such as payment transactions, fund transfer transactions, dispute transactions, refund transactions via the service provider server 130. Even though only one merchant server 120 is shown in FIG. 1, it has been contemplated that one or more merchant servers (each similar to merchant server 120) may be communicatively coupled with the service provider server 130 and the user devices 110 and 170-190 via the network 160 in the system 100.

The service provider server 130, in one embodiment, may be maintained by the online service provider, which may provide electronic transaction services for various users (e.g., the user 140 of user device 110, the merchant 128, etc.). As such, the service provider server 130 may include one or more service applications 138 (e.g., various transaction processing systems) for processing transaction requests received from the user 140 and/or the merchant 128. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service applications 138 may include a payment processing application (not shown) for processing purchases and/or payments for electronic transactions between a user and a merchant or between any two entities, a dispute processing application for processing disputes arising from transactions between two entities, a refund processing application for processing refunds for a merchant, and possibly other transaction processing systems for processing different transaction requests for the online service provider. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content (e.g., webpages) in response to HTTP requests. In another example, the interface server 134 may include an application server configured to interact with a corresponding application (e.g., a service provider mobile application) installed on the user devices 110 and 170-190 via one or more protocols (e.g., RESTAPI, SOAP, etc.). As such, the interface server 134 may include pre-generated electronic content ready to be served to users. At least some of the pages (e.g., webpages) served to users are associated with electronic transactions. For example, the interface server 134 may store a log-in page (e.g., log-in webpage) and is configured to serve the log-in page to users for logging into user accounts of the users to access various service provided by the service provider server 130. The interface server 134 may also store a payment page (e.g., a payment webpage) and is configured to serve the payment page to users for conducting electronic payment transactions. As a result, a user may access a user account associated with the user and access various electronic services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with individual users and merchants. For example, account information may include private financial information (e.g., funding account information) of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user (and/or its agents) may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a dual control module 132 that implements the dual control system as discussed herein. In some embodiments, the dual control module 132 is configured to enable the service provider server to process transaction requests according to a dual control workflow based on one or more of the service applications 138 (e.g., transaction processing systems) that is configured to process transaction requests only according to a single control workflow. The dual control module may be inserted in between the interface server 134 and the service applications 138 to implement the dual control workflow functionalities. In some embodiments, the dual control module 132 may intercepts transaction requests transmitted by a requester (e.g., the user 140 or an agent of the merchant associated with the merchant server 120, etc.) received by the interface server 134, authorizing or denying the transaction requests according to the dual control workflow, and forwarding the transaction requests to the service applications 138 only after the transaction requests are authorized. To authorize a transaction request, the dual control module 132 may determine one or more approver, who may be different from the requester, for approving the transaction request and may prompt the approver for approving the transaction request. While waiting for the approval from the approver, the dual control module 132 may store the transaction request as a new record in a data storage separate from the service applications 138 without transmitting the transaction request to the service applications 138. When the dual control module 132 receives the approval for the transaction request from the approver, the dual control module 132 may update the record in the data storage and forward the transaction request and its associated data to one of the service applications 138 for processing the transaction request. When a service application transmits a response based on processing the transaction request, the dual control module 132 may intercepts the response. The dual control module 132 may update the record associated with the transaction request based on the response before forwarding the response to the interface server 134. The dual control module 132 may also provide a notification to the approver based on the response generated by the service application.

Figure 2:
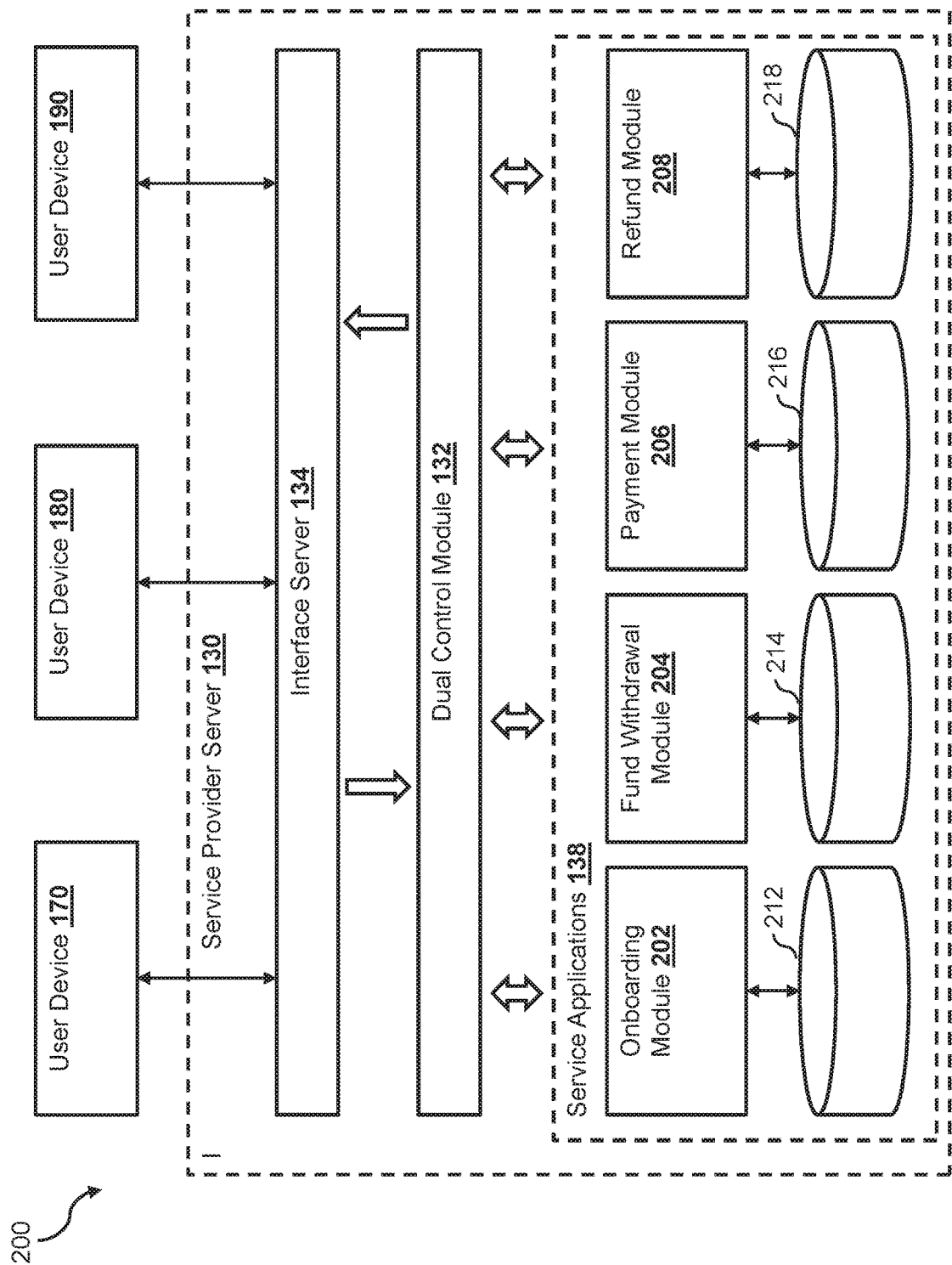
FIG. 2 illustrates a computer environment in which a dual control module may be implemented according to an embodiment of the present disclosure.

FIG. 2 illustrates an implementation of the dual control module 132 within a computer environment 200 of the service provider server 130 according to an embodiment of the disclosure. As shown, the computer environment 200 includes a dual control module 132 implemented in between the interface server 134 and the service applications 138. In some embodiments, the interface server 134 may be configured to interact with user devices, such as user devices 170-190 (and other user devices such as the user device 110). For example, the interface server 134 may be configured to receive transaction requests (e.g., login requests, onboarding requests, payment requests, fund transfer requests, etc.) from the user devices 170-190 and transmit information associated with an account (e.g., the account of the merchant) and other data (e.g., confirmation of a processed transaction, etc.) to the user devices 170-190.

In some embodiments, the service applications 138 may include different transaction processing systems for processing different types of transactions based on incoming transaction requests that the interface server 134 received. In this example, the service applications 138 may include an onboarding module 202 for processing onboarding requests to create accounts for new users. The service applications 138 may also include a fund withdrawal module 204 for processing funds withdrawal requests, a payment module 206 for processing electronic payment requests, and a refund module 208 for processing refund requests. Each of the transaction processing systems may also be associated with a database for storing data associated with transactions that have been processed by the corresponding transaction processing systems. For example, the onboarding module 202 may be associated with a database 212, the fund withdrawal module 204 may be associated with a database 214, the payment module 206 may be associated with a database 216, and the refund module 208 may be associated with a database 218. It is appreciated that the service applications 138 may include additional modules for processing other types of transactions not described here without departing from the spirit of the disclosure.

The merchant 128 associated with the merchant server 120 may be an organization having different agents (e.g., different employees) working for the merchant. It may be desirable for multiple agents of the merchant 128 to be able to access the account of the merchant 128 with the service provider server 130 and conduct transactions via the service provider server 130 on behalf of the merchant 128. In some embodiments, each of the agents may be provided with different user credentials (e.g., user names, passwords, etc.) for authentication purposes and for allowing them to access the account of the merchant 128 via the service provider server 130. While those agents who are provided with the user credentials may all access the account of the merchant 128, their access levels may be different, depending on the roles and/or privileges assigned to each of them. For example, a first agent (e.g., a secretary) of the merchant 128 may be authorized to only view account information of the account but may not be authorized to submit any transaction request. A second agent (e.g., a refund manager) of the merchant 128 may be authorized to submit a refund transaction request for refunding a charge back to a customer of the merchant 128 from a funding account associated with the merchant. A third agent (e.g., an investment manager) of the merchant 128 may be authorized to submit a fund transfer transaction request for transferring funds between funding accounts associated with the merchant 128. Thus, the different agents of the merchant 128 may use the user devices 170-190 to submit transaction requests to the interface server 134.

In order to improve security and avoid mis-use of resources, the merchant 128 may, for certain types of transactions (e.g., high risk transactions such as payment or withdrawal transaction in an amount over a threshold), want to require the transactions submitted to the service provider server 130 by a requester (e.g., the refund manager, the investment manager, etc.) to be approved by one or more designated approvers (e.g., a treasurer of the merchant) before a transactions associated with the transaction request are processed. In some embodiments, the dual control module 132 that is implemented within the computer environment 200 between the interface server 134 and the service applications 138 is configured to enable the service provider server 130 to process one or more types of transactions according to a dual control workflow.

Figure 3:
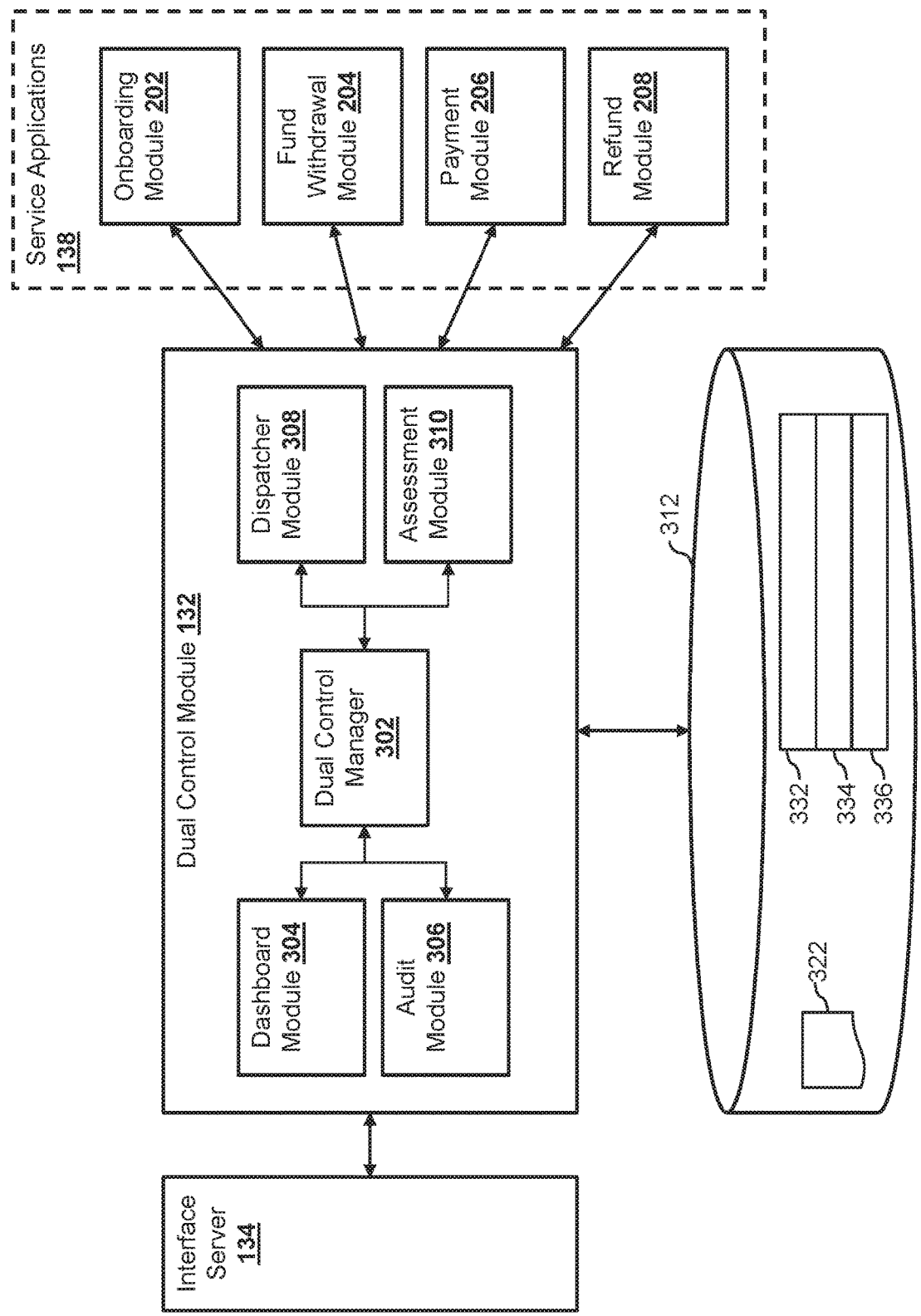
FIG. 3 is a block diagram illustrating the dual control module according to an embodiment of the present disclosure.

FIG. 3 illustrates a block diagram of the dual control module 132 according to an embodiment of the disclosure. The dual control module 132 includes a dual control manager 302, a dashboard module 304, a dispatcher module 306, and an assessment module 310. These components, as with others in this figure, may be implemented as stored executable computer instructions in various embodiments. In some embodiments, the dual control manager 302 may generate, for each account with the online service provider, a dual control configuration file that specifies a dual control configuration for the account. For example, the dual control manager 302 may generate a dual control configuration file 322 for the account of the merchant 128 associated with the merchant server 120 and store the dual control configuration file in a data storage 312 associated with the dual control module 132. In some embodiments, the data storage 312 is external to (separate from) all of the service applications 138 (e.g., the onboarding module 202, the fund withdrawal module 204, the payment module 206, and the refund module 208) and is inaccessible by the service applications 138.

The dual control configuration file 322 may specify a set of conditions associated with a transaction request for triggering the dual control workflow in processing the transaction request. In some embodiments, when the dual control configuration file is generated, the dual control manager 302 may initialize it with data that specifies that no transaction requests (or all transaction requests) are processed according to the dual control workflow.

The dashboard module 304 may be configured to provide user interface(s) on user devices (e.g., the user devices 170-190) to enable different users and/or agents of the users to interact with the dual control module 132. In some embodiments, the dashboard module 304 may provide a configuration interface that enables a user or an agent of a user to configure a dual control configuration associated with an account. For example, an agent of the merchant 128 may use a user device (e.g., the user device 170), via the interface server 134, to access the configuration interface provided by the dashboard module 304. In some embodiments, the configuration interface may present different transaction types associated with transactions that the service applications 138 are configured to process. For example, the dashboard module 304 may present, on the configuration interface, transaction types such as an onboarding transaction type associated with the onboarding module 202, a fund withdrawal transaction type associated with the fund withdrawal module 204, a payment transaction type associated with the payment module 206, and a refund transaction type associated with the refund module 208. Each of the transaction types presented on the configuration interface may be associated with a selectable user interface element (e.g., a toggle, a button, etc.) for selecting the associated transaction type. The selecting of the transaction type may enable the dual control workflow for processing transaction requests of the transaction type. For example, when the agent selects the withdrawal transaction type and the payment transaction type on the configuration interface, the dashboard module 304 may determine that transaction requests associated with the withdrawal transaction type or the payment transaction type are required to be processed according to the dual control workflow.

In some embodiments, when a transaction type (e.g., the payment transaction type) is selected, the configuration interface may enable the agent to provide additional conditions (e.g., via a text box or other input elements). For example, the agent may specify an additional condition of an amount exceeding a threshold amount ($5,000) for triggering the dual control workflow in processing the withdrawal transaction requests and payment transaction requests (in other words, only withdrawal transaction requests or payment transaction requests for amounts over the threshold amount requires processing according to the dual control workflow). In another example, the agent may specify that an additional condition of a particular payee (e.g., a particular vendor) for triggering the dual control workflow in processing the payment transaction requests (in other words, only payment transaction requests associated with the particular payee requires processing according to the dual control workflow).

In addition to obtaining inputs related to the conditions for triggering the dual control workflow, the dashboard module 302 may also obtain, via the configuration interface information related to a set of criteria for controlling the flow of the transaction request. In some embodiments, the set of criteria may specify one or more identities of approver(s) for approving the transaction requests before the transaction requests can be processed according to the dual control workflow. For example, the agent of the merchant 128 may indicate an identity of a treasurer (e.g., a user name of the treasurer with the online service provider) as the approver for approving transaction requests according to the dual control workflow. In some embodiments, multiple approvers may be specified through the configuration interface. When multiple approvers are specified through the configuration interface, the agent may also specify which approver is designated for approving which type of transactions such that different approvers may be qualified for approving different transaction types. In some embodiments, the agent may also specify multiple approvers for a single transaction type. In this case, the agent may further specify that a transaction request associated with that transaction type can be approved by any of the designated approvers or must be approved by all of the designated approvers.

Based on the inputs provided by the agent via the configuration interface, the dashboard module 304 may modify the dual control configuration file 322 associated with the merchant 128. For example, the dashboard module 304 may modify the dual control configuration file 322 to specify that withdrawal transaction requests and payment transaction requests that are over the threshold amounts (e.g., $5,000) are required to be processed according to the dual control workflow, and that the treasurer of the merchant 128 is the designated approver for approving such transaction requests.

In some embodiments, as incoming transaction requests are received by the interface server 134, the interface server 134 may transmit the transaction requests to the dual control module 132 (e.g., through an application programming interface (API) that mimics the API of the service applications 138, etc.). In some embodiments, the dual control module 132 may intercept the incoming transaction requests when the interface server 134 transmits the transaction requests to the service applications 138 (e.g., by detecting that a transaction request is transmitted from the service applications 138 intended for one of the service applications 138 and obtaining the transaction request, etc.). Either way, the dual control module 132 that is implemented between the interface server 134 and the service applications 138 may be configured to obtain and withhold the incoming transaction requests from the service applications 138, until the dual control module 132 determines that a set of criteria (e.g., the transaction request is approved by a designated approver) is satisfied. Each of the transaction requests received by the interface server 134 and intercepted by the dual control module 132 may include one or more parameters such as an account identifier of an account through which the transaction request is generated, a transaction type associated with the transaction request, an amount, a payee identifier, and other information associated with the transaction request. For example, when an agent of the merchant 128 uses the user device 170 to submit a request for a payment transaction in an amount of $7,500, the transaction request obtained by the dual control manager 302 may include parameters such as an account identifier associated with the merchant 128, data indicating that the transaction request is a payment transaction type, the amount of $7,500, an identifier of a payee account (e.g., an account associated with a vendor, etc.), and possibly other information.

In some embodiments, the transaction request also includes other payload data such as data associated with a user device that submitted that transaction request. For example, when the transaction request is submitted by the agent of the merchant 128 using the user device 170, the transaction request may include data associated with the user device 170 such as an Internet Protocol (IP) address of the user device 170, an identifier of the user device 170, an application type (e.g., a browser type) used to submit the transaction request, and possibly other data associated with the user device 170.

When the dual control manager 302 obtains a transaction request from the interface server 134, the dual control manager 302 may first determine an account associated with the transaction request. The dual control manager 302 may determine the account that is associated with the transaction request based on the account identifier included in the transaction request. The dual control manager 302 may then access a dual control configuration file in the data storage 312 associated with the account based on the account identifier. For example, when the dual control manager 302 determines that the transaction request is associated with the account of the merchant 128, the dual control manager 302 may access the dual control configuration file 322.

The assessment module 310 may analyze the transaction request to determine whether the conditions specified in the dual control configuration file 322 are satisfied for triggering the dual control workflow. For example, when the dual control configuration file 322 specifies a set of conditions including a condition of a payment transaction type and an amount exceeding $5,000, the assessment module 310 may determine whether the transaction request is for a payment transaction in an amount over $5,000 based on the data included in the transaction request. If the assessment module 310 determines that the transaction request does not satisfy the conditions specified in the dual control configuration file 322, the dispatcher module 308 may forward (e.g., transmit) the transaction request to one of the service applications 138 based on the transaction type of the transaction request (e.g., transmitting the payment transaction request to the payment module 206) for processing the transaction request.

However, if the assessment module 310 determines that the conditions specified in the dual control configuration file 322 is satisfied, the dual control manager 302 may process the transaction request according to the dual control workflow. According to the dual control workflow, the dual control manager 302 may determine the set of criteria (e.g., requirements) before releasing the transaction request to the service applications 138 based on the dual control configuration file 322. For example, the dual control manager 302 may determine one or more approvers required to approve the transaction request before releasing the request to the service applications 138 based on the dual control configuration file 322. In some embodiments, the dual control manager 302 may generate a record (e.g., the record 332) for the transaction request to track a progress of processing the transaction request according to the dual control workflow. The dual control manager 302 may generate a dual control workflow identifier for the transaction request and associate the dual control workflow identifier with the transaction request. For example, the dual control manager 302 may insert the dual control workflow identifier in the record 332. In some embodiments, the dual control manager 302 may modify the transaction request to track a progress of processing the transaction request by various other modules (e.g., one or more service applications 138, etc.). In some embodiments, the dual control manager 302 may insert metadata (e.g., the dual control workflow identifier or other metadata) into the transaction request. The dual control workflow identifier can be used to track the transaction request once it is dispatched to the service applications 138 and a response generated by the service applications 138. In some embodiments, the dual control workflow may also indicate, in the record 332, the set of criteria (e.g., pending approval(s)), and whether each of the criteria has been satisfied (e.g., whether an approval is obtained from each approver).

The dual control manager 302 may then transmit notification(s) to the approver(s) of the transaction request, prompting the approver(s) for approving or denying the transaction request. In some embodiments, the dual control manager 302 may transmit a notification to a user device that is associated with the approver (e.g., the user device 180). Once the approver (e.g., the treasurer) receives the notification on the user device 180, the approver may log in to the account of the merchant 128 using the user credentials associated with the approver and may approve or deny the transaction request. In some embodiments, the dashboard module 304 may present a pending approval dashboard interface on the user device 180 when the approver logs in to the account of the merchant 128 using the user credentials of the approver. The pending approval dashboard interface may present transaction request(s) that are awaiting the approval of the approver. Thus, the approver may approve (and/or deny) multiple transaction requests all at once through the pending approval dashboard interface. The pending approval dashboard interface may also enable the approver to select any one of the pending transaction request(s). Once a transaction request is selected, the dashboard module 304 may present data associated with the transaction request, such as an identity of the requester, a transaction type and amount associated with the request, a date/time when the transaction request was submitted, etc.

Before the set of criteria associated with the transaction request is satisfied (e.g., the transaction request has not been approved or denied by the approver designated for the transaction request), the dual control module 132 may allow the requester to cancel the transaction request. For example, when the requester logs in to the account of the merchant 128 using the user credentials of the requester on the user device 170, the dashboard module 304 may present on the user device 170 a pending transaction request interface that presents all of the transaction requests submitted by the requester and not yet processed. The pending transaction request interface may also indicate, for each transaction request, a status, such as pending approval by approver(s), approved by approver(s), being processed by a transaction processing system, etc. Through the pending transaction request interface, the dashboard module 304 may enable the requester to select and cancel any one of the transaction request presented on the interface. When the dashboard module 304 receives an indication for canceling the transaction request, the dashboard module 304 may update the record 332 with the cancellation of the transaction request (or alternatively removing the record 332 from the data storage 312). Once the transaction request is canceled, the dashboard module 304 may no longer present the transaction request on the pending approval dashboard interface for the approver.

When the dashboard module 304 receives an approval or a denial of the transaction request from the approver via the pending approval dashboard interface, the dashboard module 304 may update the record 332 based on the approval or the denial. For example, the dashboard module 304 may insert data such as an identifier of the approver, date/time when the approver submits the approval or denial, or any other comments from the approver for approving or denying the transaction request. In some embodiments, a database controller associated with the data storage 312 (not shown) may send an event signal to the dual control manager 302 when a transaction request record (e.g., the record 332) is updated. Based on the event signal, the dual control manager 302 may analyze the record 332 to determine if the set of criteria is satisfied (e.g., approved by all designated approver(s)). In some embodiments, the dual control manager 302 may periodically analyze the records (e.g., records 332, 334, and 335) in the data storage 312 to determine whether the corresponding set of criteria is satisfied.

When the dual control manager 302 determines that the set of criteria is not yet satisfied (e.g., pending approval from a second approver, etc.), the dual control manager 302 may continue to withhold the transaction request from being sent to the service applications 138 and await another event signal (e.g., approval or denial from the second approver). If the dual control manager 302 determines that the approver has denied the transaction request based on the record 332, the dual control manager 302 may insert a flag in the record 332 such that the dual control manager 302 will no longer analyze the record 332 in the future. Even if the transaction request is denied, the record 332 may remain in the data storage 312 such that the dashboard module 304 may present information related to the transaction request such as the approver who denied the transaction request and a reasoning that the approver provided for denying the request to the requester on the pending transaction request interface.

When the dual control manager 302 determines that the set of criteria is satisfied (e.g., the transaction request was approved by the designated approver(s)), the dual control manager 302 may use the dispatcher module 308 to retrieve the modified transaction request along with other data such as the parameters, and the payload data, from the record 332 and to transmit the retrieved data to one of the service applications 138 based on the transaction type associated with the transaction request. In this example, since the transaction request is associated with a payment request, the dispatcher module 308 may transmit the data retrieved from the record 332 to the payment module 206.

Since the dual control workflow is implemented within the dual control module 132 that is separate from the service applications 138, the payment module 206 is unaware of the requesting and approving process and the involvement of the requester and the approver. When the payment module 206 receives the transaction request, it is no different (from the perspective of the payment module 206) from receiving the transaction request directly from the interface server 134 without the implementation of the dual control module 132. In some embodiments, the only difference is the modification to the transaction request performed by the dual control module 132, such as insertion of metadata (e.g., the dual control workflow identifier) to the transaction request. The payment module 206 may process a transaction (e.g., a payment transaction) associated with the transaction request, for example, by transferring funds (e.g., the amount indicated in the transaction request) from the account of the merchant 128 to an account of the payee indicated in the transaction request. In some embodiments, the payment module 206 may generate a response based on the processing of the transaction (e.g., completed, failed, etc.), and may transmit the response to the interface server 134. The response generated by the payment module 206 may include a transaction identifier associated with the transaction, the dual control workflow identifier included in the transaction request, a status of the transaction (e.g., completed, failed, etc.), and possibly other data related to the transaction.

In some embodiments, the dual control module 132 implemented between the interface server 134 and the service applications 138 may intercept the response sent by the payment module 206. Based on the dual control workflow identifier included in the response, the dual control manager 302 may identify a record (e.g., the record 332) corresponding to the transaction, and may update the record using the data included in the response. In some embodiments, the dual control manager 302 may forward the response to the interface server 134 for providing an indication of the response to the requester. In some embodiments, instead of or in addition to forwarding the response to the interface server 134, the dual control manager 302 may transmit a notification of the response to both the requester (e.g., on the pending transaction request interface) and the approver (e.g., on the pending approval dashboard interface), informing them the result of processing the transaction.

As discussed above, the records 332-336 stored in the data storage 312 for different transaction requests may be used to generate an audit trail for the corresponding transaction. For example, through an interface provided by the interface server 134, an agent of the merchant may submit an audit trail request for an existing transaction (e.g., the transaction that was processed by the payment module 206 corresponding to the record 332). The interface server 134 may transmit the audit trail request, which may include a transaction identifier, to the dual control module 132. Upon receiving the audit trail request, the audit module 306 may use the transaction identifier to identify a record (e.g., the record 332) in the data storage 312. The record 332 may include all of the data associated with processing the transaction request according to the dual control workflow, including information about the submission of the transaction request (e.g., the requester identity, a timestamp associated with the submission of the transaction request, a transaction type, etc.), information about the approval and/or denial from one or more designated approvers (e.g., the approver identity, a timestamp of the approval or denial, reasons for the approval or denial, etc.), and information about the processing of the transaction (e.g., a status of the processing, a timestamp of the process of the transaction, etc.). Thus, the audit module 306 may transmit all of the information included in the record 332 to the interface server 134 for presenting on a user device (e.g., the user device 190) of the agent.

Figure 4:
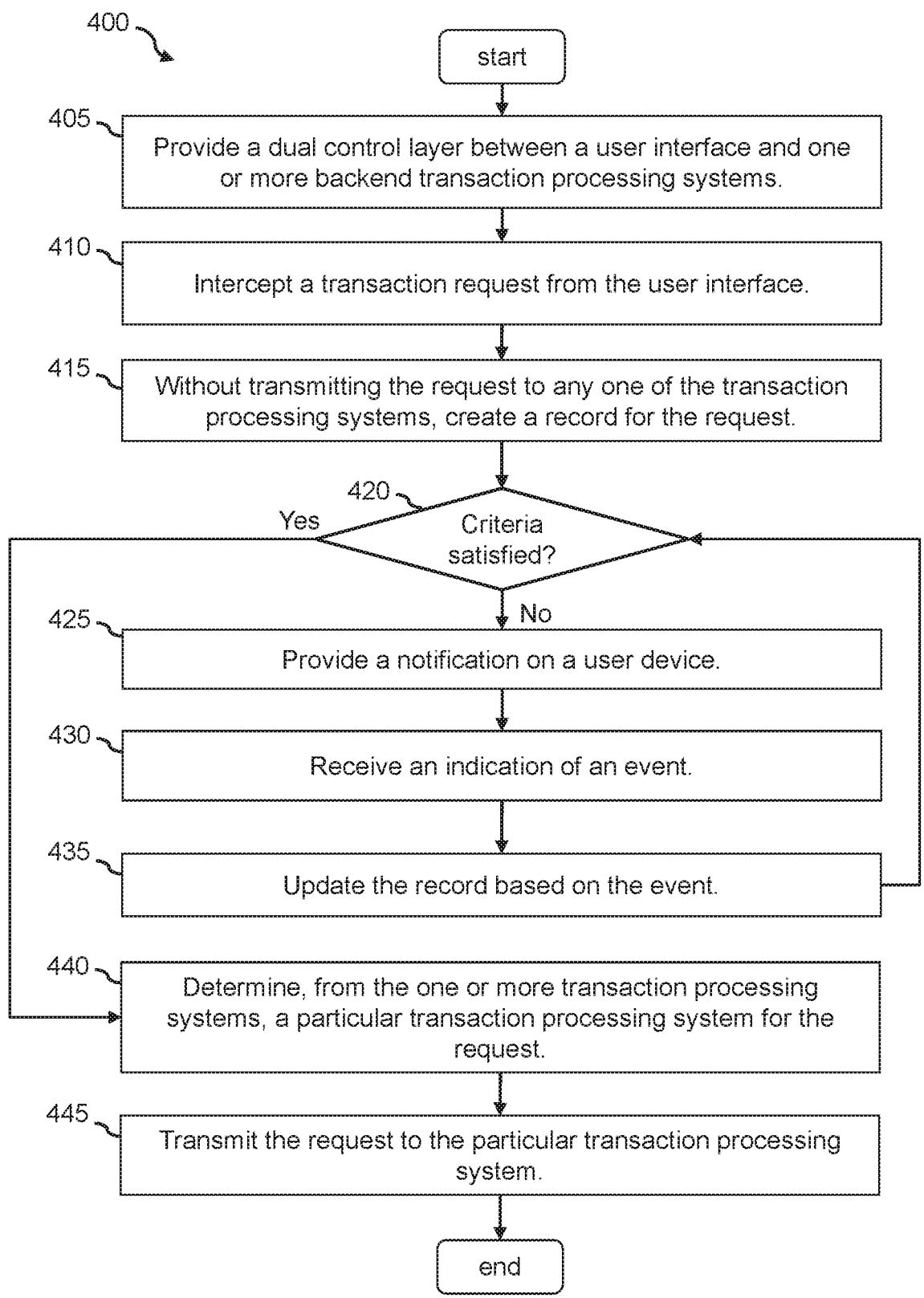
FIG. 4 is a flowchart showing a process of implementing the dual control module within the computer environment according to an embodiment of the present disclosure.

FIG. 4 illustrates a process 400 for implementing a dual control workflow within one or more transaction processing systems that are configured to process transaction requests according to a single control workflow according to some embodiments of the disclosure. In some embodiments, all or a portion of the process 400 may be performed by the dual control module 132, which may be implemented on one or more computer systems. The process 400 begins by providing (at step 405) a dual control layer between a user interface and one or more backend transaction processing systems. For example, the dual control module 132 may be implemented within the computer environment 200 of the service provider server 130 between the interface server 134 and the service applications 138, as illustrated in FIG. 2. The process 400 then intercepts (at step 410) (or otherwise obtains) a transaction request from the user interface and creates (at step 415) a record for the request without transmitting the request to any one of the transaction processing systems. For example, the interface server 134 may receive a transaction request submitted from a requester via the user device 170. Upon receiving the transaction request, the interface server 134 may transmit the transaction request to the dual control module 132. In some embodiments, the dual control module 132 may intercept the transaction requests when the interface server 134 transmits the transaction request to the service applications 138. Either way, the dual control module 132 that is implemented between the interface server 134 and the service applications 138 may obtain and withhold the transaction request from the service applications 138, until the dual control module 132 determines that a set of criteria associated with the transaction request (e.g., the transaction request is approved by a designated approver) is satisfied. In some embodiments, the dual control module 132 may create a record (e.g., the record 332) for the transaction request, and stores data associated with the transaction request such as a transaction type, parameters of the transaction request, payload data, an identity of the requester, a timestamp of the transaction request, etc. in the record 332.

The process 400 then determines (at step 420) whether the set of criteria is satisfied. If it is determined that the set of criteria is not satisfied, the process 400 provides (at step 425) a notification on a user device. For example, the dual control manager 302 may access a dual control configuration file associated with an account indicated in the transaction request and may determine a set of criteria for processing the transaction request. In one example, the set of criteria may include obtaining an approval from a designated approver. Accordingly, the dual control module 132 may transmits a notification to a user device (e.g., the user device 180) associated with the approver, prompting the approver to approve or deny the request (e.g., via the pending approval dashboard interface).

The process 400 then receives (at step 430) an indication of an event and updates (at step 435) the record based on the event. For example, the dual control module 132 may receive an approval from the designated approver for the transaction request via the pending approval dashboard interface. Based on the approval, the dual control module 132 may update the record 332 to indicate that the transaction request has been approved by the approver.

After updating the record, the process 400 reverts back to the step 420 to determine if the set of criteria is now satisfied. For example, the dual control module 132 may analyze the record 332 to determine whether all of the designated approvers (e.g., when there are multiple approvers) have approved the transaction request. If the set of criteria is still not satisfied, the dual control module 132 may transmit another notification to the approver(s) who still have not provided an approval or denial to the transaction request.

On the other hand, when it is determined that the set of criteria is satisfied, the process 400 determines (at step 440), from the one or more transaction processing systems, a particular transaction processing system for the request, and transmits (at step 445) the request to the particular transaction processing system. For example, the dual control module 132 may determine a transaction type (e.g., a payment transaction type) based on the transaction request and may select the payment module 206 among the service applications 138 as the transaction processing system for processing the transaction request. The dual control module 132 may then dispatch the transaction request along with other data from the record 332 to the payment module 206.

Figure 5:
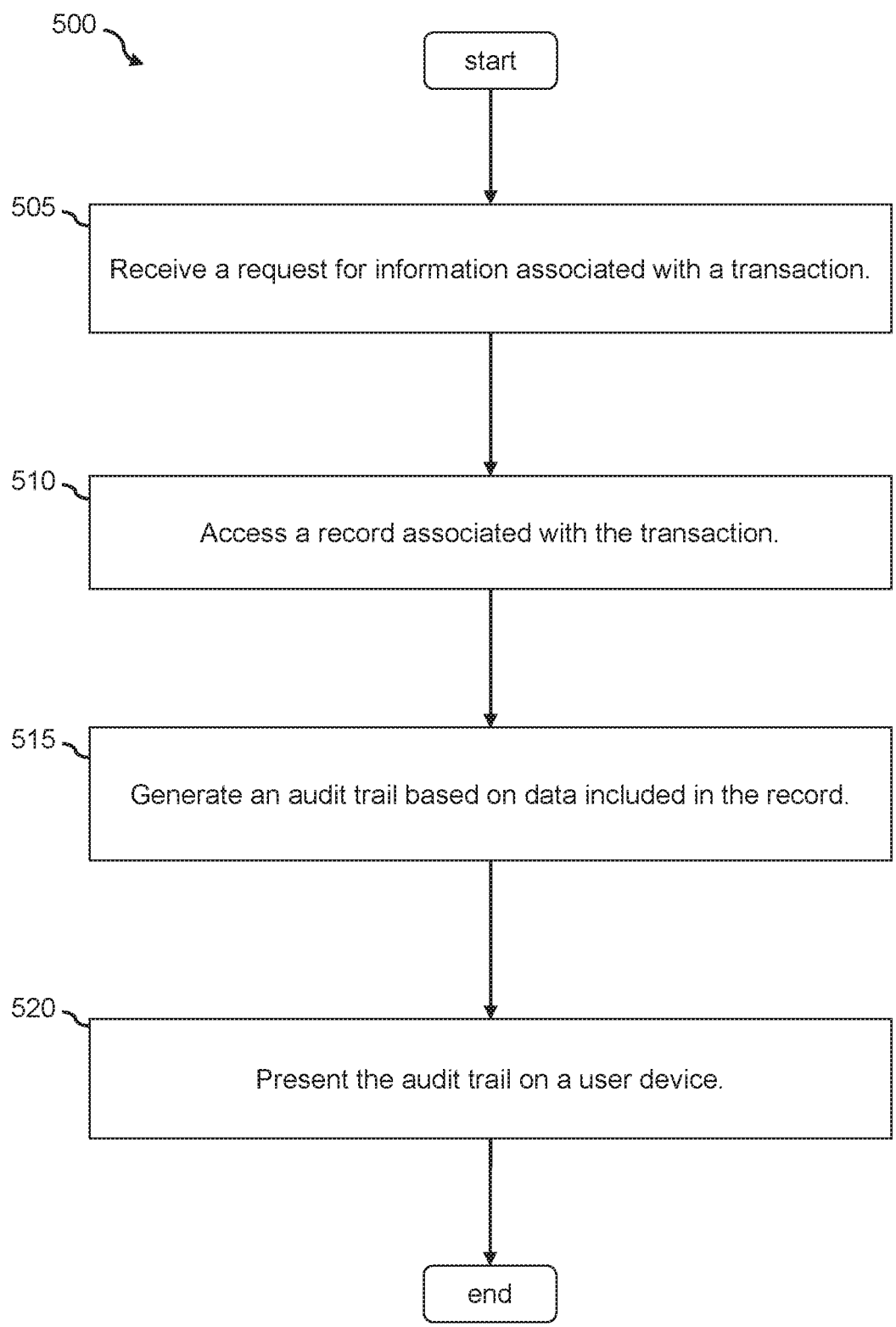
FIG. 5 is a flowchart showing a process of generating an audit trail for the dual control module according to an embodiment of the present disclosure.

FIG. 5 illustrates a process 500 for generating an audit trail for a transaction request processed according to the dual control workflow according to some embodiments of the disclosure. In some embodiments, all or a portion of the process 500 may be performed by the dual control module 132, which may be implemented on one or more computer systems. The process 500 begins by receiving (at step 505) a request for information associated with a transaction. For example, the dual control module 132 may receive, from the interface server 134, an audit trail request associated with a transaction submitted by an agent of the merchant 128. The audit trail request may include a transaction identifier associated with the transaction.

The process 500 then accesses (at step 510) a record associated with the transaction. For example, based on the transaction identifier included in the audit trail request, the dual control module 132 may identify a record (e.g., the record 332) in the data storage 312. The process 500 then generates (at step 515) an audit trail based on data included in the record and presents (at step 520) the audit trail on a user device. For example, the dual control module 132 may generates an audit trail based on the information stored in the record 332, which may include information about the submission of the transaction request (e.g., the requester identity, a timestamp associated with the submission of the transaction request, a transaction type, etc.), information about the approval and/or denial from one or more designated approvers (e.g., the approver identity, a timestamp of the approval or denial, reasons for the approval or denial, etc.), and information about the processing of the transaction (e.g., a status of the processing, a timestamp of the process of the transaction, etc.). In some embodiments, the dual control module 132 may transmit all of the information included in the record 332 to the interface server 134 for presenting on a user device (e.g., the user device 190) of the agent.

Figure 6:
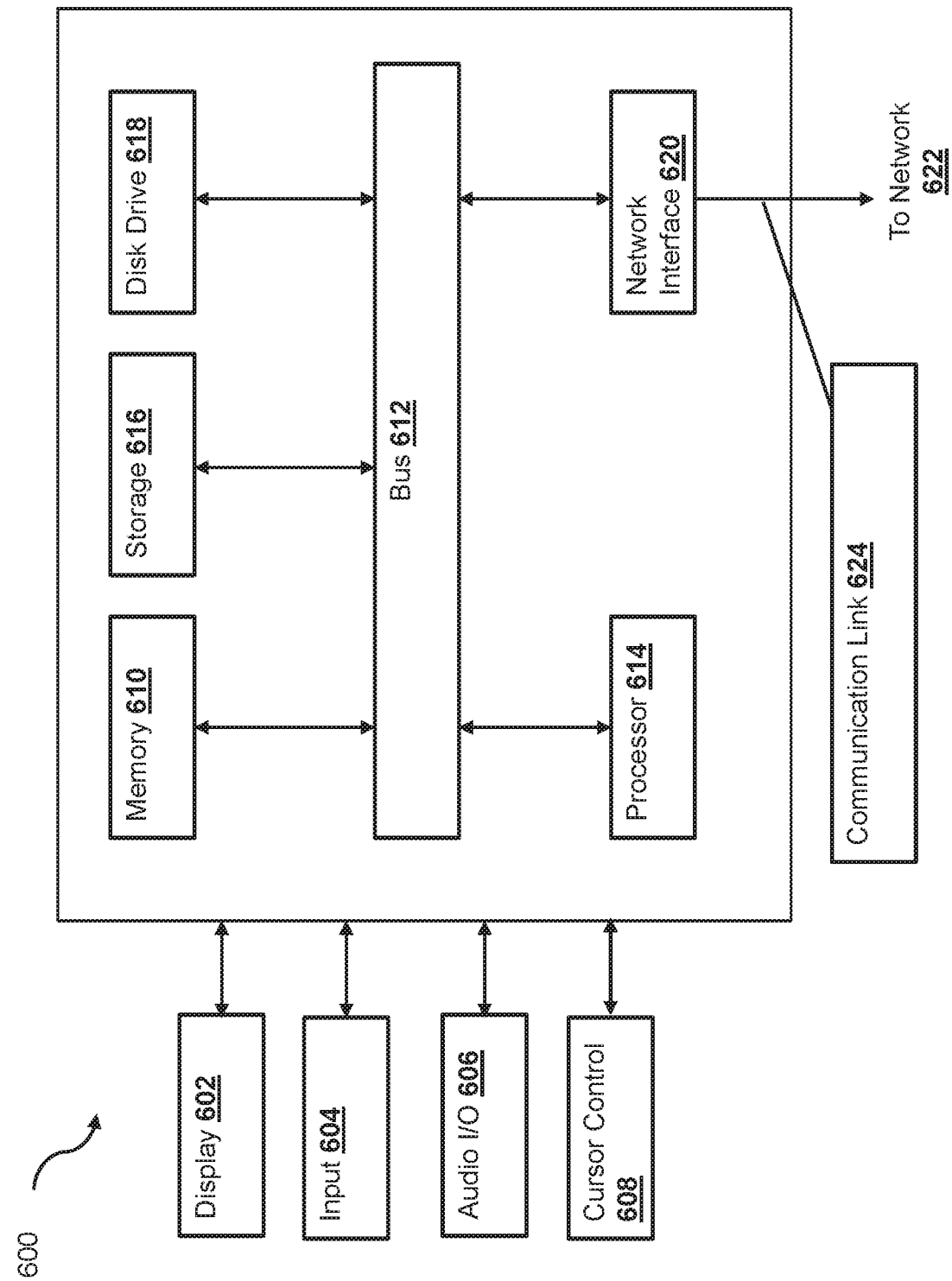
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the merchant server 120, and the user devices 110 and 170-190. In various implementations, each of the user devices 110 and 170-190 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, and 170-190 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the dual control functionalities described herein according to the processes 400 and 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled with the non-transitory memory and configured to read instructions from the non-transitory memory to cause the system to perform operations comprising:
        intercepting, by a dual control module implemented between an interface server and a plurality of transaction processing systems, a transmission of a transaction request that is addressed to a particular transaction processing system of the plurality of transaction processing systems, wherein the transaction request is for performing a transaction for an account with an online service provider, wherein the particular transaction processing system only supports single control workflows for processing transactions;
        determining, by the dual control module, that the transaction request was submitted by a requester based on the transaction request;
        without communicating the transaction request to any one of the plurality of transaction processing systems:
            determining, by the dual control module and based on a dual control configuration of the account, that the requester lacks authority to approve the transaction;
            in response to determining that the requester lacks the authority to approve the transaction, determining a designated approver who has the authority to approve the transaction based on the dual control configuration;
            withholding the transaction request from being transmitted to the particular transaction processing system prior to receiving an approval from the designated approver;
            modifying the transaction request by inserting a dual control workflow identifier in the transaction request;
            storing the modified transaction request in a data record associated with the dual control workflow identifier; and
            receiving, from the designated approver, the approval for the transaction; and
        in response to receiving the approval, transmitting the modified transaction request, including the dual control workflow identifier, to the particular transaction processing system for processing the transaction.

2. The system of claim 1, wherein the operations further comprise:
    intercepting, by the dual control module from the particular transaction processing system, a response generated based on processing the transaction;
    identifying, by the dual control module from a plurality of data records, the data record based on the dual control workflow identifier included in the response; and
    updating, by the dual control module, the data record based on the response.

3. The system of claim 2, wherein the operations further comprise:
    transmitting, by the dual control module, a notification to a device associated with the designated approver indicating a status of the transaction included in the response.

4. The system of claim 2, wherein the transaction is associated with a transaction identifier, and wherein the operations further comprise:
    receiving a request for an audit trail associated with the transaction, wherein the request comprises the transaction identifier;
    determining that the transaction identifier corresponds to the dual control workflow identifier;
    accessing the updated data record based on the dual control workflow identifier; and
    presenting data included in the updated data record on a device.

5. The system of claim 1, wherein the data record is stored in a data storage external to and inaccessible by the plurality of transaction processing systems.

6. The system of claim 1, wherein the operations further comprise:
    presenting, on a device associated with the designated approver, a pending approval dashboard interface comprising a list of transaction requests, including the transaction request, that are pending approvals from the designated approver, wherein the approval for the transaction is received via the pending approval dashboard interface.

7. The system of claim 1, wherein the operations further comprise:
    intercepting a second transaction request from the interface server, wherein the second transaction request was submitted by a second requester who lacks authority to approve a second transaction associated with the second transaction request;

receiving, from the second requester, a cancellation request for canceling the second transaction request prior to obtaining a second approval from a second designated approver for the second transaction request; and in response to receiving the cancellation request, discarding the second transaction request without transmitting the second transaction request to any one of the plurality of transaction processing systems.

8. A method, comprising:

providing a dual control module configured to intercept transaction requests transmitted between a user interface server and a plurality of transaction processing systems, wherein each of the plurality of transaction processing systems is configured to support single control workflows for processing a corresponding type of transaction requests;

intercepting, by one or more hardware processors associated with the dual control module from the user interface server, a transaction request intended for a particular transaction processing system of the plurality of transaction processing systems, wherein the transaction request is for a transaction of a particular transaction type and associated with a first account submitted through a first user credential associated with a first user;

determining, by the one or more hardware processors associated with the dual control module, that the particular transaction type is subject to a dual control workflow and that the first user lacks an authority to approve the transaction request based on a dual control configuration associated with the first account; and without communicating the transaction request to the particular transaction processing system:
  determining a second user who has the authority to approve the transaction based on the dual control configuration;
  withholding the transaction request from being transmitted to the particular transaction processing system prior to receiving an approval from the second user;
  modifying the transaction request by inserting a dual control workflow identifier in the transaction request;
  storing the modified transaction request in a data record associated with the dual control workflow identifier; and
  presenting a notification on a user interface associated with the second user, wherein the notification prompts the second user for the approval of the transaction request.

9. The method of claim 8, further comprising:

prior to receiving the approval to the transaction request from the second user, receiving a request to cancel the transaction request; and in response to receiving the request to cancel the transaction request, removing the transaction request from the data storage without transmitting the transaction request to the particular transaction processing system.

10. The method of claim 8, further comprising:

receiving, via the user interface associated with the second user, the approval to the transaction request from the second user; and in response to receiving the approval, retrieving the modified transaction request from the data storage and transmitting the modified transaction request to the particular transaction processing system.

11. The method of claim 10, further comprising:

intercepting, by the dual control module, a response from the particular transaction processing systems;

identifying, from a plurality of data records, the data record based on the dual control workflow identifier included in the response; and updating the data record based on the response.

12. The method of claim 10, further comprising:

generating an audit trail for the transaction based on the transaction request and data associated with the approval; and storing the audit trail in the data record.

13. The method of claim 8, further comprising:

receiving, via the user interface associated with the second user, a denial to the transaction request from the second user; and in response to receiving the denial, storing data associated with the denial in the data storage record without transmitting the transaction request to the particular transaction processing system.

14. The method of claim 13, further comprising transmitting a second notification related to the denial to a device associated with the first user.

15. A non-transitory machine-readable medium having stored thereon machine-readable instructions executable to cause a machine to perform operations comprising:

obtaining, by a dual control module implemented between an interface server and a plurality of transaction processing systems, a transmission of a transaction request that is addressed to a particular transaction processing system of the plurality of transaction processing systems, wherein the transaction request is for performing a transaction for an account of an online service provider, and wherein the particular transaction processing system only supports single control workflows for processing transactions;

determining, by the dual control module, that the transaction request was submitted by a requester based on the transaction request;

without communicating the transaction request to any one of the plurality of transaction processing systems:
  determining, by the dual control module and based on a dual control configuration of the account, that the requester lacks authority to approve the transaction;
  in response to determining that the requester lacks the authority to approve the transaction, determining a designated approver who has the authority to approve the transaction based on the dual control configuration;
  withholding the transaction request from being transmitted to the particular transaction processing system prior to receiving an approval from the designated approver;
  modifying the transaction request by associating a dual control workflow identifier with the transaction request;
  storing the modified transaction request in a data record associated with the dual control workflow identifier; and
  receiving, from the designated approver, the approval for the transaction; and in response to receiving the approval, transmitting the modified transaction request to the particular transaction processing system for processing the transaction.

16. The non-transitory machine-readable medium of claim 15, wherein the operations further comprise:

presenting, on a device associated with the designated approver, a pending approval dashboard interface comprising a list of transaction requests, including the transaction request, that are pending approvals from the designated approver, wherein the approval for the transaction is received via the pending approval dashboard interface.

17. The non-transitory machine-readable medium of claim 15, wherein the operations further comprise:

determining that the transaction is associated with an amount exceeding a threshold, and wherein the determining that the requester lacks the authority to approve the transaction is further based on the determining that the amount exceeds the threshold.

18. The non-transitory machine-readable medium of claim 15, wherein the data record is stored in a data storage that is external to the plurality of transaction processing systems and is inaccessible by the plurality of transaction processing systems.

19. The non-transitory machine-readable medium of claim 15, wherein the operations further comprise:

intercepting, by the dual control module from the particular transaction processing system, a response generated based on processing the transaction;

identifying, by the dual control module from a plurality of data records, the data record based on the dual control workflow identifier included in the response; and updating, by the dual control module, the data record based on the response.

20. The non-transitory machine-readable medium of claim 19, wherein the operations further comprise:

transmitting, by the dual control module, a notification to a device associated with the designated approver indicating a status of the transaction included in the response.

* * * * *